United States Patent
Pillai et al.

(10) Patent No.: US 12,242,384 B2
(45) Date of Patent: *Mar. 4, 2025

(54) COMPRESSION AWARE PREFETCH

(71) Applicant: Advanced Micro Devices, Inc., Santa Clara, CA (US)

(72) Inventors: Pazhani Pillai, Tewksbury, MA (US); Harish Kumar Kovalam Rajendran, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,152

(22) Filed: Jan. 27, 2023

(65) Prior Publication Data

US 2023/0169007 A1    Jun. 1, 2023

Related U.S. Application Data

(63) Continuation of application No. 17/371,035, filed on Jul. 8, 2021, now Pat. No. 11,567,872.

(51) Int. Cl.
| | |
|---|---|
| *G06F 12/0862* | (2016.01) |
| *G06F 12/02* | (2006.01) |
| *G06F 12/0895* | (2016.01) |
| *G06F 12/04* | (2006.01) |
| *G06F 12/0886* | (2016.01) |
| *G06F 12/0888* | (2016.01) |

(52) U.S. Cl.
CPC ...... *G06F 12/0862* (2013.01); *G06F 12/0238* (2013.01); *G06F 12/0895* (2013.01); *G06F 2212/466* (2013.01)

(58) Field of Classification Search
CPC ............ G06F 12/0862; G06F 12/0238; G06F 12/0895; G06F 2212/466
USPC ........................................................ 711/154
See application file for complete search history.

(56) References Cited

U.S. PATENT DOCUMENTS

| | | | |
|---|---|---|---|
| 2010/0077146 A1* | 3/2010 | Hosoda | G06F 12/0862 |
| | | | 711/E12.001 |
| 2010/0088369 A1 | 4/2010 | Sebastian et al. | |
| (Continued) | | | |

OTHER PUBLICATIONS

Vitter et al, Optimal Prefetching via Data Compression, 1996, Journal of the ACM, vol. 43 (Year: 1996).*

*Primary Examiner* — Prasith Thammavong
*Assistant Examiner* — Sidney Li
(74) *Attorney, Agent, or Firm* — Volpe Koenig (57) ABSTRACT

Methods, devices, and systems for prefetching data. First data is loaded from a first memory location. The first data in cached in a cache memory. Other data is prefetched to the cache memory based on a compression of the first data and a compression of the other data. In some implementations, the compression of the first data and the compression of the other data are determined based on metadata associated with the first data and metadata associated with the other data. In some implementations, the other data is prefetched to the cache memory based on a total of a compressed size of the first data and a compressed size of the other data being less than a threshold size. In some implementations, the other data is not prefetched to the cache memory based on the other data being uncompressed.

20 Claims, 6 Drawing Sheets

(56) References Cited

U.S. PATENT DOCUMENTS

2016/0041905 A1\* 2/2016 Turner ................ G06F 12/0886
 711/3
2018/0074949 A1 3/2018 Verrilli
2020/0327061 A1 10/2020 Tan \* cited by examiner

COMPRESSION AWARE PREFETCH

CROSS REFERENCE TO RELATED APPLICATIONS

This application claims the benefit of U.S. patent application Ser. No. 17/371,035 filed Jul. 8, 2021, the content of which is hereby incorporated by reference herein.

BACKGROUND

Many processing devices utilize caches to reduce the average time required to access information stored in a memory. A cache is a smaller and faster memory that stores copies of instructions or data that are expected to be used relatively frequently. For example, central processing units (CPUs), one type of processor that uses caches, are generally associated with a cache or a hierarchy of cache memory elements. Other processors, such as graphics processing units (GPUs), also implement cache systems. Instructions or data that are expected to be used by the processor are moved from (relatively large and slow) main memory into the cache. When the CPU requests to read or write a location in the main memory, the CPU first checks to see whether a copy of the information corresponding to the desired memory location is included in the cache memory. If the information corresponding to this location is included in the cache (a cache hit), then the CPU can perform the read or write operation on the copy in the cache memory location. If the information corresponding to this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

Prefetching is a technique where the lines in the cache are populated before the information in these lines has been requested. In some cases, circuitry configured to perform the prefetching monitors memory requests associated with applications running in the processor to determine or predict whether the processor is likely to access a particular sequence of memory addresses in a memory region based the monitored requests.

Conceptually, prefetching can be implemented between any two memories where information is copied from one to another. For example, information can be prefetched into a cache from a memory such as a a dynamic random-access memory (DRAM), can be prefetched from a storage device, such as a hard disk, to a DRAM, can be prefetched from a relatively slower, lower level cache (e.g., L2 cache) to a relatively faster, higher level cache (e.g., L1 cache).

BRIEF DESCRIPTION OF THE DRAWINGS

A more detailed understanding can be had from the following description, given by way of example in conjunction with the accompanying drawings wherein.

DETAILED DESCRIPTION

Some implementations provide a method for prefetching data. First data is loaded from a first memory location. The first data in cached in a cache memory. Other data is prefetched to the cache memory based on a compression of the first data and a compression of the other data.

In some implementations, the compression of the first data and the compression of the other data are determined based on metadata associated with the first data and metadata associated with the other data. In some implementations, the other data is prefetched to the cache memory based on a total of a compressed size of the first data and a compressed size of the other data being less than a threshold size. In some implementations, the other data is not prefetched to the cache memory based on the other data being uncompressed. In some implementations, the other data is not prefetched to the cache memory based the first data being uncompressed. In some implementations, the other data is stored in a memory location adjacent to the first memory location. In some implementations, the other data includes second data and third data. In some implementations, the second data and the third data are prefetched to the cache memory based on a total of a compressed size of the first data, a compressed size of the second data, and a compressed size of the third data being less than a threshold size.

In some implementations, the other data includes second data and third data. In some implementations, the second data is prefetched to the cache memory and the third data is not prefetched the third data to the cache memory, based on a total of a compressed size of the first data and a compressed size of the second data being less than a threshold size, and based on a total of the compressed size of the first data, the compressed size of the second data, and the compressed size of the third data being greater than the threshold size. In some implementations, the second data and the third data are prefetched to the cache memory based on a total of the compression of the first data, a compression of the second data, and a compression of the third data being more highly compressed than a threshold compression. In some implementations, the second data is prefetched to the cache memory and not prefetching the third data is not prefetched to the cache memory, based on a total of a compression of the first data and a compression of the second data being more highly compressed than a threshold compression, and based on a total of the compression of the first data, the compression of the second data, and a compression of the third data being less compressed than the threshold compression.

Some implementations provide a processing device configured to prefetch data. The processing device includes circuitry configured to load first data from a first memory location. The processing device also includes circuitry configured to cache memory the first data in a cache memory. The processing device also includes circuitry configured to prefetch other data to the cache memory based on a compression of the first data and a compression of the other data.

Some implementations include circuitry configured to determine the compression of the first data and the compression of the other data based on metadata associated with the first data and metadata associated with the other data. Some implementations include circuitry configured to prefetch the other data to the cache memory based on a total of a compressed size of the first data and a compressed size of the other data being less than a threshold size. Some implementations include circuitry configured to not prefetch the other data to the cache memory based on the other data being uncompressed. Some implementations include circuitry configured to not prefetch the other data to the cache memory based the first data being uncompressed. In some implementations, the other data is stored in a memory location adjacent to the first memory location.

In some implementations, the other data includes second data and third data, and the processing device also includes circuitry configured to prefetch the second data and the third data to the cache memory, based on a total of a compressed size of the first data, a compressed size of the second data, and a compressed size of the third data being less than a threshold size. In some implementations, the other data includes second data and third data, and the processing device also includes circuitry configured to prefetch the second data to the cache memory and not prefetch the third data to the cache memory, based on a total of a compressed size of the first data and a compressed size of the second data being less than a threshold size, and based on a total of the compressed size of the first data, the compressed size of the second data, and the compressed size of the third data being greater than the threshold size.

In some implementations, the other data includes second data and third data, and the processing device also includes circuitry configured to prefetch the second data and the third data to the cache memory, based on a total of the compression of the first data, a compression of the second data, and a compression of the third data being more highly compressed than a threshold compression. In some implementations, the other data includes second data and third data, and the processing device also includes circuitry configured to prefetch the second data to the cache memory and not prefetching the third data to the cache memory, based on a total of a compression of the first data and a compression of the second data being more highly compressed than a threshold compression, and based on a total of the compression of the first data, the compression of the second data, and a compression of the third data being less compressed than the threshold compression.

Figure 1:
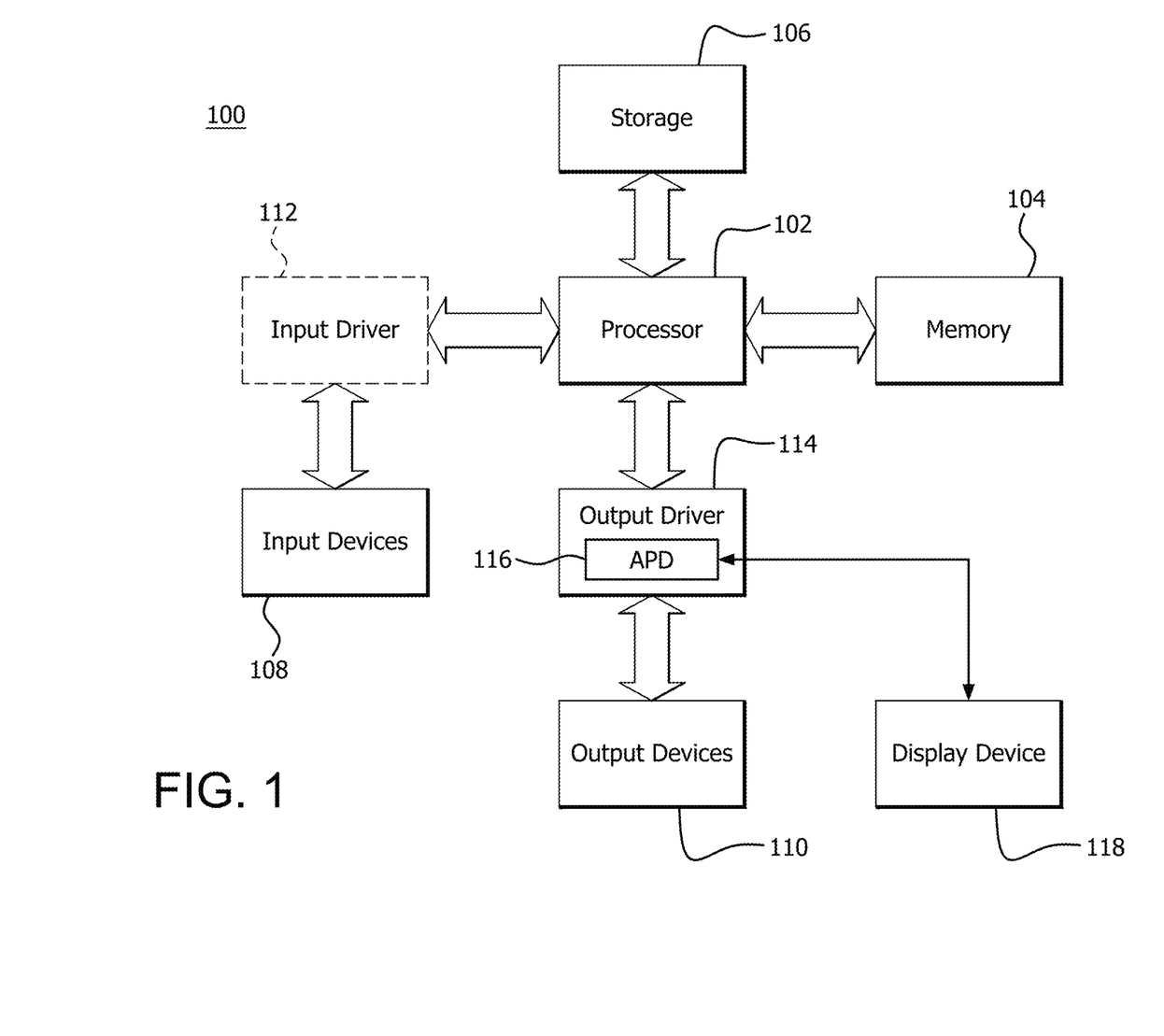
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
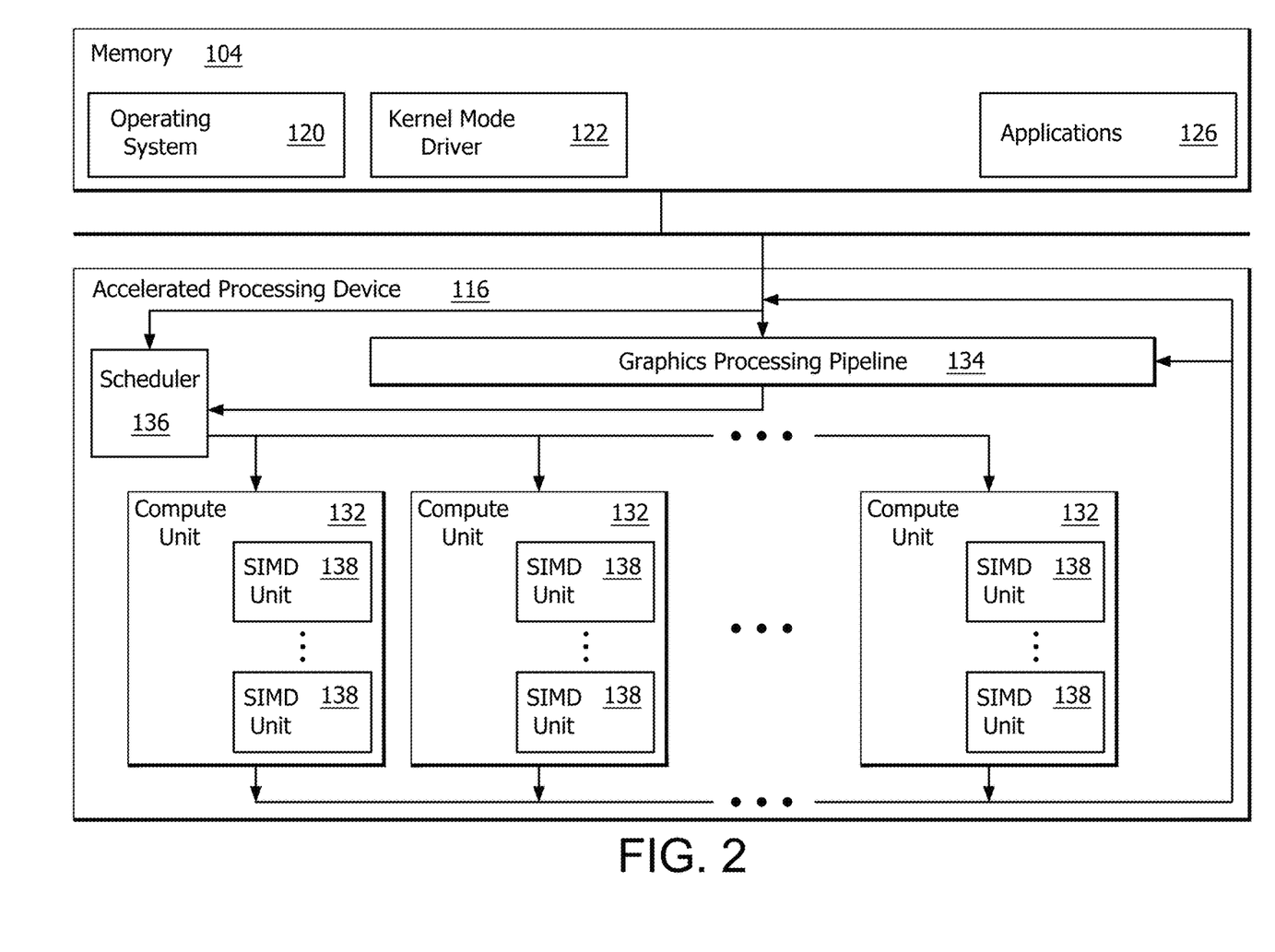
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
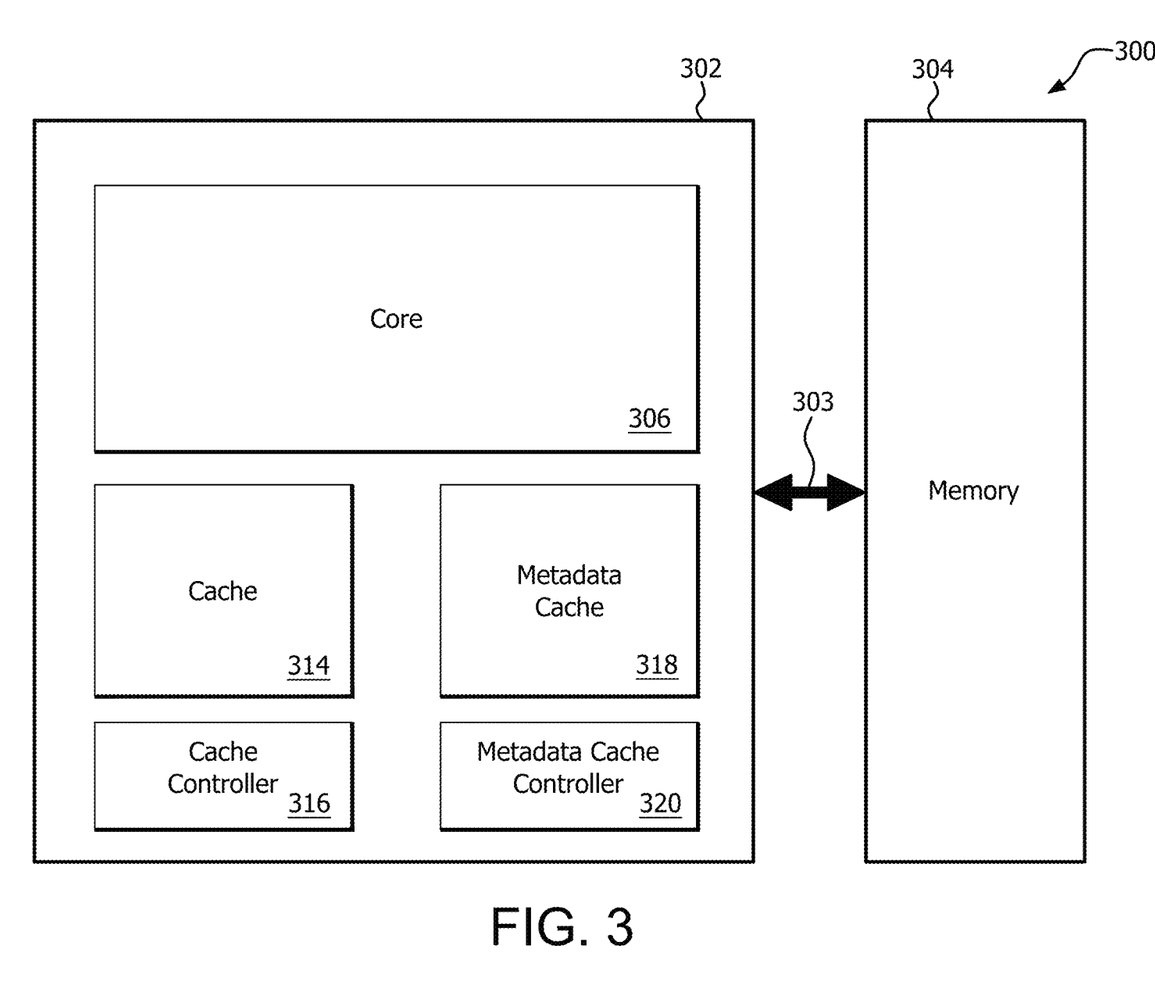
FIG. 3 is a block diagram illustrating an example processing system which implements data prefetching.

FIG. 3 is a block diagram illustrating an example processing system 300 which implements data prefetching. Processing system 300 includes a processor 302 in communication with a memory 304 over a memory bus 303. Processing system 300 is implementable in any suitable way using any suitable hardware, e.g., using some or all of the components of device 100, as shown and described with respect to FIG. 1. Processor 302 includes any suitable processing device, such as a CPU, GPU, or APD (e.g., processor 102, or APD 116 as shown and described with respect to FIGS. 1 and 2). Memory 304 includes any suitable memory device, such as a DRAM or other non-transitory computer readable medium (e.g., memory 104 as shown and describe with respect to FIGS. 1 and 2).

Processor 302 includes a processor core 306, cache 314, cache controller 316, metadata cache 318, and metadata cache controller 320. It is noted that these components are exemplary and that processor 302 includes different components in some implementations. For example, in some implementations, cache 314, and/or metadata cache 318 are parts of a first level (L1) cache. In some implementations, processor 302 includes further cache levels; e.g., a level 2 (L2) cache, level 3 (L3) cache, etc.

Processor core 306 is configured to execute program instructions, such as instructions which load data stored at an address in memory 304 into a register, or to load a block of data stored in memory 304 starting at the address into a block of registers. Processor core 306 performs operations on the data in the register rather than in the memory 304 because it is faster to access the data in the register than to access the data in the memory 304. Under certain conditions, the data (e.g., after being modified and no longer needed in the register) is stored back to the memory location in memory 304 and removed from the register.

Cache 314 is a memory that is slower to access than a register, but is capable of storing a larger amount of data. Cache 314 is faster to access than memory 304, but is capable of storing a smaller amount of data. Cache 314 is configured to store or "cache" a copy of the data or block loaded from the address in memory 304 to a location in the cache 314 (e.g., a cache line or cache block) for future use, if needed. For example, in a case where the data has been removed from the register but is requested by processor core 306 to be loaded to the register once again, the data is loadable from cache 314 instead of loading it from memory 304 (unless it has been evicted from cache 314).

In some implementations, the data is cached when the data is loaded from memory 304 to the register. Caching, and maintaining coherence between the copy of the data stored in cache 314 and the copy of the data stored in memory 304 (and any other cache level or memory device in some implementations) is managed in any suitable manner, such as by cache controller 316. Caching data in this way can have the advantage of reducing data access latency in some cases.

Cache 314 is also configured to prefetch data under certain circumstances. For example, in addition to caching a copy of the data or block loaded from the address in memory 304 to the register or registers responsive to the instruction to load the data, cache 314 also caches data from other addresses in memory 304 (e.g., at an adjacent address, or an adjacent block or range of addresses) responsive to the instruction to load the data stored at the address, in some cases. In some implementations, suitable hardware (e.g., cache controller 316) determines whether to prefetch other data into cache 314, and/or which data to prefetch.

Metadata cache 318 is a memory that stores information describing data or blocks of data, such as the data or block loaded from the address in memory 304 to the register or registers. For example, in some implementations, a data block is associated with metadata indicating a compression ratio of the data block (e.g., indicating 1:1 for uncompressed, 8:1 for compressed, etc.). In some implementations, associated metadata is cached in the metadata cache 318 responsive to the instruction to load the data block to registers, or responsive to the traffic relating to the load operation. In some implementations, the traffic includes any stimulus (e.g., a signal which includes the data and metadata address, or a signal derived from this information, e.g., which is input to the metadata cache 318, metadata cache controller 320) which causes the metadata cache 318 to cache the associated metadata. The metadata cache 318 is implemented separately in this example. In some implementations however, metadata, data, and/or instructions are stored in the same cache (e.g., an undifferentiated L1 cache).

In some implementations, prefetching is based on metadata. For example, in some implementations, in addition to caching a copy of the data or block loaded from the address in memory 304 to the register responsive to the instruction to load the data, cache 314 also caches data from other addresses in memory 304 (e.g., at an adjacent address, or an adjacent block or range of addresses) responsive to the instruction to load the data stored at the address, based on metadata associated with the data loaded from the address in memory 304 (or based on the address). For example, in some implementations, one or more data blocks adjacent to a data block loaded from the memory 304 are prefetched or not prefetched based on a compression (e.g., a compression ratio, compression type, etc.) of the data block loaded from memory 304 as indicated by the metadata, based on a compression of the adjacent data blocks, or based on a combination of these (e.g., based on whether an average compression ratio of the data blocks is above a threshold compression ratio). In some implementations, the adjacent data blocks are prefetched or not prefetched based on whether the total compressed size of the data block and the adjacent data blocks (e.g., indicated by the metadata or determined based on the compression indicated by the metadata) is below a threshold size. In some implementations, the thresholds are programmable and/or dynamically adjustable. For example, in some implementations, the thresholds are based on a chance of overfetching (i.e., fetching data that is not later used), where, in some implementations, a lower threshold decreases the chances of overfetching, but decreases the chance of hits on neighboring blocks, and a higher threshold increases the chance of overfetching, but increases the chance of hits on neighboring blocks. In some implementations, the thresholds are based on a minimum burst size of a DRAM device to achieve full utilization of the DRAM device (e.g., 128 bytes), or based on application tuning, etc.

Figure 4:
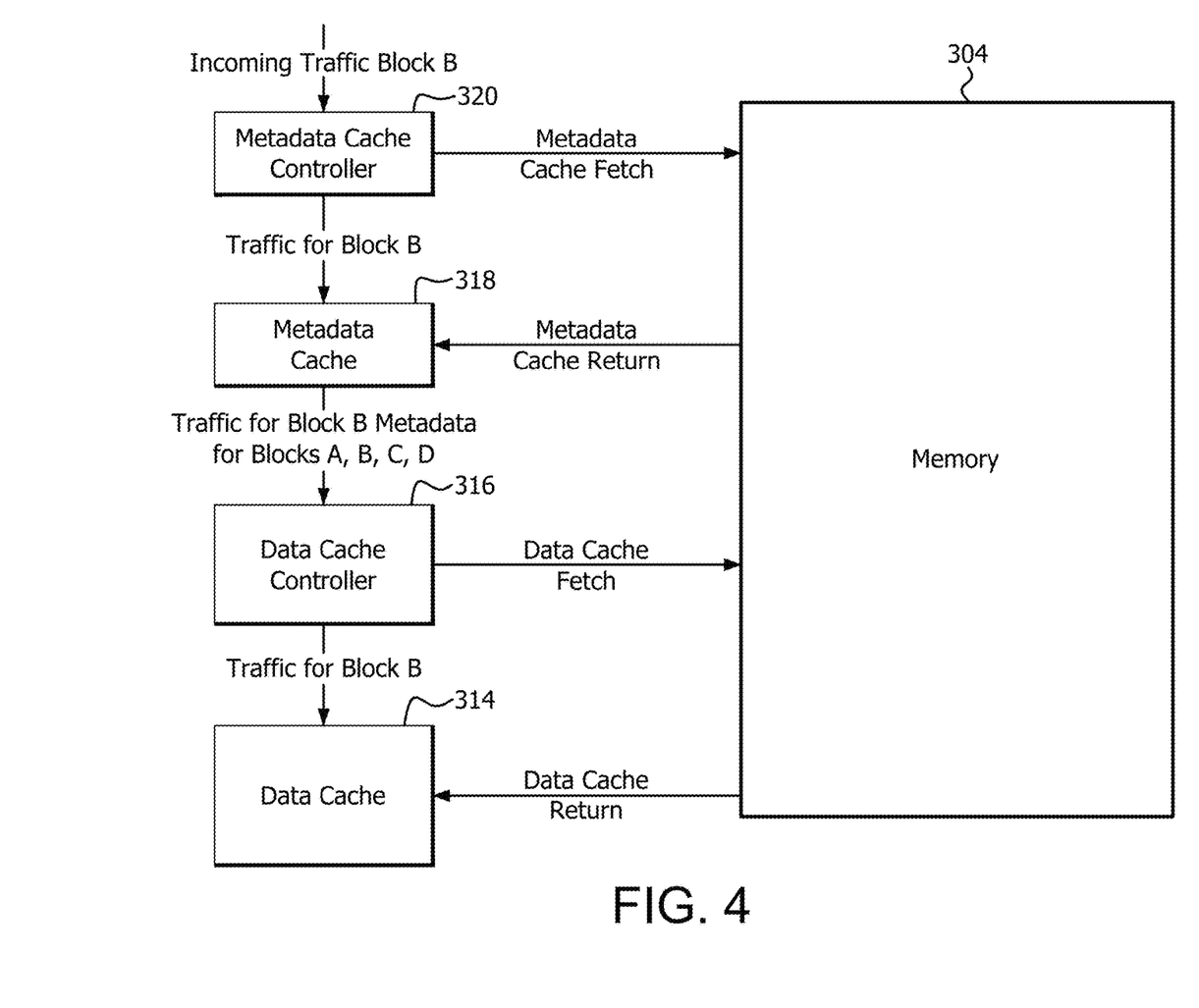
FIG. 4 is a block diagram illustrating aspects of the example processing system shown and described with respect to FIG. 3, including information flow during an example prefetching operation.

FIG. 4 is a block diagram illustrating aspects of example processing system 300, as shown and described with respect to FIG. 3, including information flow during an example prefetching operation.

In the example shown in FIG. 4, a data block B is loaded from memory 304, and will accordingly be cached in cache 314. The traffic (e.g., data and/or control signals, address lines, etc.) relating to the load operation are input to metadata cache controller 320, which, in response, fetches metadata associated with block B from memory 304. The metadata fetch returns metadata associated with 4 aligned consecutive pieces of metadata in this example, in this case, for blocks A, B, C, and D. The metadata for blocks A, B, C, and D is cached in in metadata cache 318. The metadata indicates the compression level of the data in each of blocks A, B, C, and D.

The traffic relating to the load of block B, and the metadata associated with blocks A, B, C, and D, are input to cache controller 316. Cache controller 316 fetches block B, and potentially prefetches other data blocks, for storage in cache 314 based on the metadata. For example, in some implementations, cache controller 316 prefetches blocks A, C, and/or D based on an average compression ratio of blocks A, B, C, and/or D being above a threshold, based on a compressed size of blocks A, B, C, and/or D being below a threshold, or a combination of these, or otherwise, e.g., as discussed with respect to FIG. 3. In some implementations, the threshold is based on efficient use of memory bandwidth. For example, if information is fetched from memory 304 in 128-byte blocks, and the compressed size of blocks A, B, C, and D are each 32 bytes, cache controller 316 prefetches blocks A, C, and D, in addition to caching block B, for a total of 128 bytes. In another example, if the compressed size of blocks A, B, C, and D are each 64 bytes, cache controller 316 prefetches one of blocks A, C, and D (e.g., chosen based on adjacency) in addition to caching block B, for a total of 128 bytes. In some implementations, the cache controller 316 determines the compressed size of the block based on the metadata, either explicitly (i.e., the metadata indicates the size) or implicitly (e.g., based on a compression ratio or other information indicated by the metadata).

Figure 5:
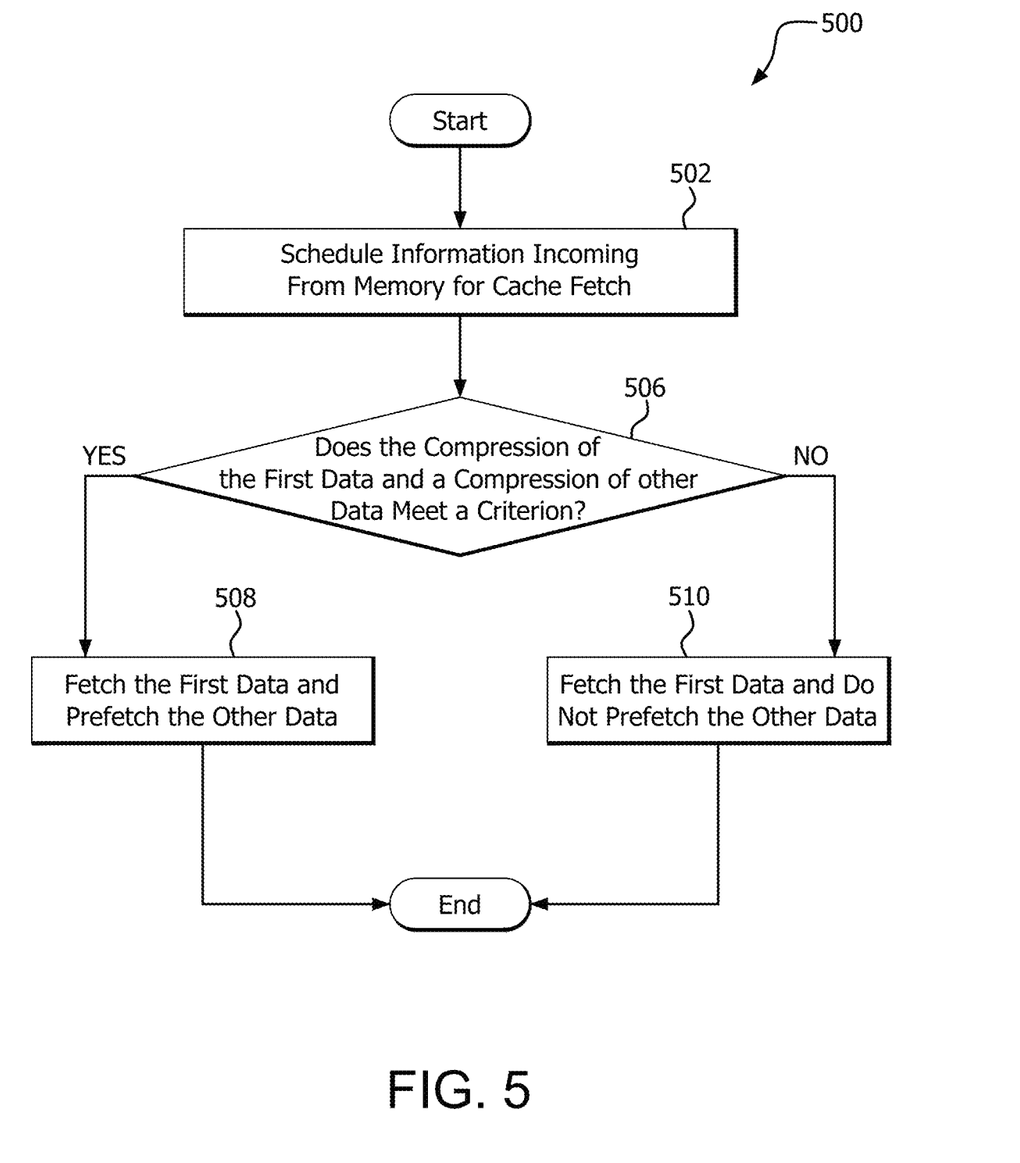
FIG. 5 is a flow chart illustrating example prefetching operation.

FIG. 5 is a flow chart illustrating an example prefetching operation 500, e.g., for processing system 300 as shown and described with respect to FIGS. 3 and 4.

In step 502, information (e.g., traffic) regarding a load of data stored in a memory location is used to schedule a fetch of the information to a cache memory On condition 506 that the compression of the data and the compression of other data (e.g., a block or blocks adjacent to the memory location) meets a criterion, both the data the other data are fetched to the cache (i.e., the data is fetched and the other data is prefeteched) in step 508. Otherwise, only the data is fetched, and the other data is not prefetched to the cache in step 510. In some implementations, the criterion is a threshold compression or compression size of the data, the other data, or an average or other combination of the first data and the other data (e.g., as shown and described with respect to FIGS. 3 and 4.) In some implementations, the criterion is a threshold size of the combination of the data and the other data.

Figure 6:
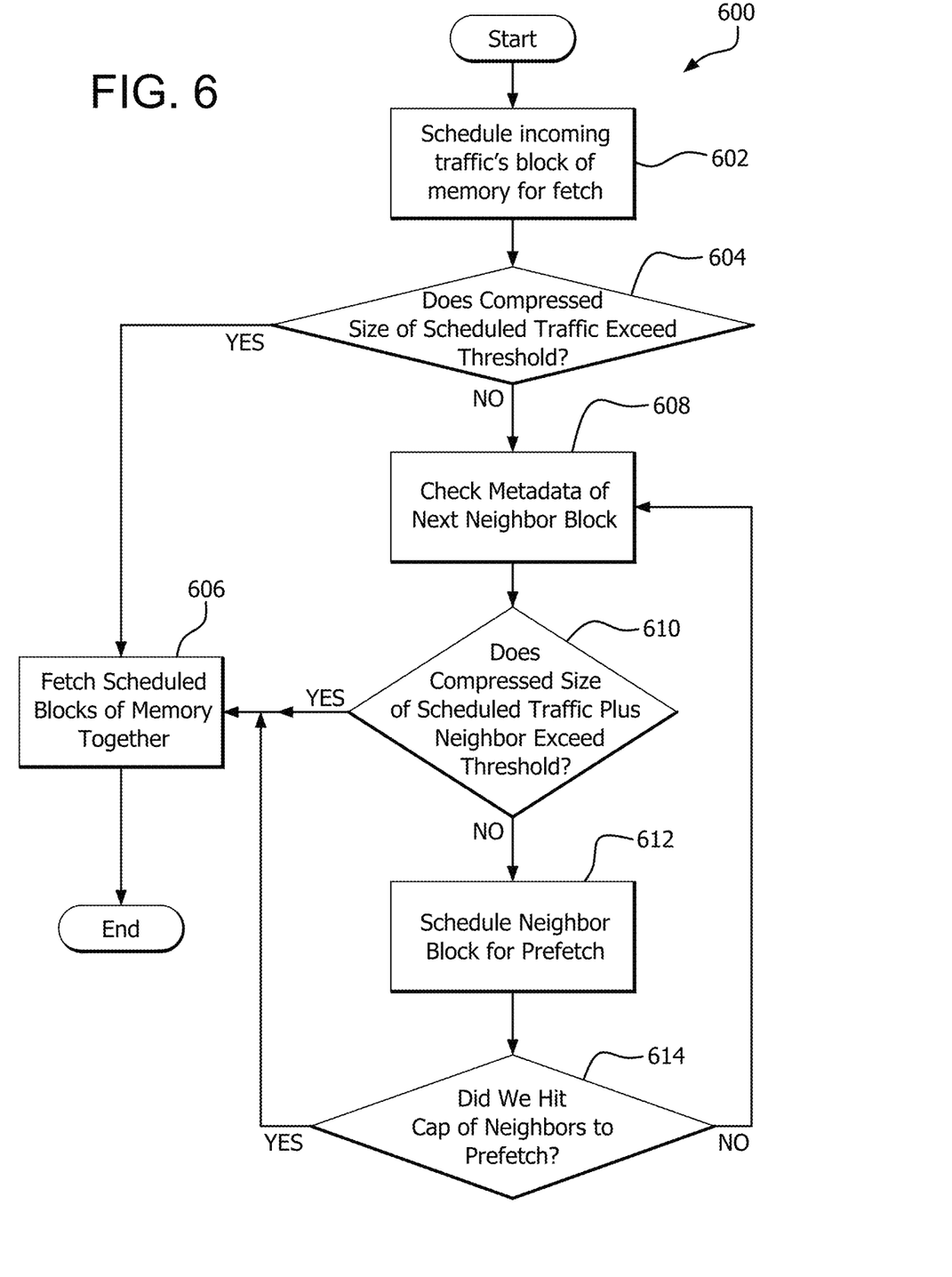
FIG. 6 is a flow chart illustrating another example prefetching operation.

FIG. 6 is a flow chart illustrating an example prefetching operation 600, e.g., for processing system 300 as shown and described with respect to FIGS. 3 and 4.

In step 602, information stored in a first block of memory is scheduled for fetching to a cache memory based on incoming traffic (e.g., indicating a load of data stored in memory). On condition 604 that the compressed size of the information stored in the first block of memory exceeds a threshold, the information stored in the first block of memory alone is fetched into the cache memory in step 606 and the procedure ends.

On condition 604 that the compressed size of the information stored in the first block of memory does not exceed the threshold, metadata of another memory block (e.g., a block neighboring the first block in memory) is checked in step 608 to determine a compressed size of the information stored in that memory block. On condition 610 that the total compressed size of the first block of memory and the compressed size of the other block of memory exceed a threshold, the information stored in the first block of memory alone is fetched into the cache memory in step 606 and the procedure ends. Otherwise, the other block is scheduled for prefetching in step 612. On condition 614 that a threshold number of blocks for prefetching has been reached, the first block of memory and the other block of memory are fetched and prefetched respectively to the cache in step 606, and the procedure ends.

On condition 614 that the threshold number of blocks for prefetching has not been reached, metadata of yet another memory block (e.g., a block neighboring the first block in memory, or neighboring another block scheduled for prefetching) is checked in step 608 to determine a compressed size of the information stored in that memory block. On condition 610 that the total compressed size of the information in the first block of memory, the compressed size of the information in any other blocks scheduled for prefetching, and the compressed size of the information in the current block of memory under consideration exceeds a threshold, the information in the first block of memory, and any other blocks of memory already scheduled for prefetching, but not the current block of memory under consideration, are fetched and prefetched respectively to the cache in step 606, and the procedure ends.

Otherwise, the current block under consideration is scheduled for prefetching in step 612. On condition 614 that a threshold number of blocks for prefetching has been reached, the first block of memory and all other blocks of memory, including the current block of memory under consideration, are fetched and prefetched respectively to the cache in step 606, and the procedure ends. Otherwise, the procedure returns to step 608.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for prefetching data, the method comprising:
loading first data from a first memory location;
caching the first data in a cache memory; and
limiting overfetching of data by prefetching other data to the cache memory based on a comparison of a threshold compression ratio indicating a minimum acceptable compression level for performing prefetching with an average of a compression ratio of the first data and of a compression ratio of the other data.

2. The method of claim 1, further comprising:
determining the compression of the first data and the compression of the other data based on metadata associated with the first data and metadata associated with the other data.

3. The method of claim 1, further comprising:
prefetching the other data to the cache memory based on the average compression ratio being greater than a threshold compression.

4. The method of claim 1, further comprising:
not prefetching the other data to the cache memory based on the other data being uncompressed.

5. The method of claim 1, further comprising:
not prefetching the other data to the cache memory based the first data being uncompressed.

6. The method of claim 1, wherein the other data is stored in a memory location adjacent to the first memory location.

7. The method of claim 1, wherein the other data comprises second data and third data, the method further comprising, based on an average of the compression ratio of the first data, of a compression ratio of the second data, and of a compression ratio of the third data being greater than a threshold compression ratio, prefetching the second data and the third data to the cache memory.

8. The method of claim 1, wherein the other data comprises second data and third data, the method further comprising, based on an average of the compression ratio of the first data and of a compression ratio of the second data being greater than a threshold compression ratio, and based on an average of the compression ratio of the first data, of the compression ratio of the second data, and of a compression ratio of the third data being less than the threshold compression ratio, prefetching the second data to the cache memory and not prefetching the third data to the cache memory.

9. The method of claim 1, wherein the other data comprises second data and third data, the method further comprising, based on an average of the compression ratio of the first data, of a compression ratio of the second data, and a compression ratio of the third data being more highly compressed than a threshold compression ratio, prefetching the second data and the third data to the cache memory.

10. The method of claim 1, wherein the other data comprises second data and third data, the method further comprising, based on an average of a compression ratio of the first data and a compression ratio of the second data being more highly compressed than a threshold compression ratio, and based on an average of the compression ratio of the first data, the compression ratio of the second data, and a compression ratio of the third data being less compressed than the threshold compression, prefetching the second data to the cache memory and not prefetching the third data to the cache memory.

11. A processing device configured to prefetch data, the processing device comprising:

circuitry configured to load first data from a first memory location;

circuitry configured to cache memory the first data in a cache memory; and circuitry configured to limit overfetching of data by prefetching other data to the cache memory based on a comparison of a threshold compression ratio indicating a minimum acceptable compression level for performing prefetching with an average of a compression ratio of the first data and of a compression ratio of the other data.

12. The processing device of claim 11, further comprising:

circuitry configured to determine the compression of the first data and the compression of the other data based on metadata associated with the first data and metadata associated with the other data.

13. The processing device of claim 11, further comprising:

circuitry configured to prefetch the other data to the cache memory based on the average compression ratio being greater than a threshold compression.

14. The processing device of claim 11, further comprising:

circuitry configured to not prefetch the other data to the cache memory based on the other data being uncompressed.

15. The processing device of claim 11, further comprising:

circuitry configured to not prefetch the other data to the cache memory based the first data being uncompressed.

16. The processing device of claim 11, wherein the other data is stored in a memory location adjacent to the first memory location.

17. The processing device of claim 11, wherein the other data comprises second data and third data, the processing device further comprising circuitry configured to, based on an average of the compression ratio of the first data, of a compression ratio of the second data, and of a compression ratio of the third data being greater than a threshold compression ratio, prefetching the second data and the third data to the cache memory.

18. The processing device of claim 11, wherein the other data comprises second data and third data, the processing device further comprising circuitry configured to, based on an average of the compression ratio of the first data and of a compression ratio of the second data being greater than a threshold compression ratio, and based on an average of the compression ratio of the first data, of the compression ratio of the second data, and of a compression ratio of the third data being less than the threshold compression ratio, prefetching the second data to the cache memory and not prefetching the third data to the cache memory.

19. The processing device of claim 11, wherein the other data comprises second data and third data, the processing device further comprising circuitry configured to, based on an average of the compression ratio of the first data, of a compression ratio of the second data, and a compression ratio of the third data being more highly compressed than a threshold compression ratio, prefetching the second data and the third data to the cache memory.

20. The processing device of claim 11, wherein the other data comprises second data and third data, the processing device further comprising circuitry configured to, based on an average of a compression ratio of the first data and a compression ratio of the second data being more highly compressed than a threshold compression ratio, and based on an average of the compression ratio of the first data, the compression ratio of the second data, and a compression ratio of the third data being less compressed than the threshold compression, prefetching the second data to the cache memory and not prefetching the third data to the cache memory.

* * * * *